US005971027A

United States Patent [19]

Beachley et al.

[11] Patent Number: 5,971,027

[45] Date of Patent: Oct. 26, 1999

[54] ACCUMULATOR FOR ENERGY STORAGE AND DELIVERY AT MULTIPLE PRESSURES

[75] Inventors: Norman H. Beachley, Verona; Frank J. Fronczak, Madison, both of Wis.

[73] Assignee: Wisconsin Alumni Research Foundation, Madison, Wis.

[21] Appl. No.: 08/881,865

[22] Filed: Jun. 24, 1997

Related U.S. Application Data

[60] Provisional application No. 60/020,738, Jul. 1, 1996.

[51] Int. Cl.[6] .......... F16L 55/04

[52] U.S. Cl. .......... 138/31; 138/30

[58] Field of Search .......... 138/30, 31

[56] References Cited

U.S. PATENT DOCUMENTS

| | | | |
|---|---|---|---|
| 819,988 | 5/1906 | Gerdau . | |
| 846,266 | 3/1907 | Von Philp | 138/31 |
| 1,007,349 | 10/1911 | Gerdau . | |
| 1,054,194 | 2/1913 | Gerdau . | |
| 1,395,174 | 10/1921 | Calhoun | 138/31 |
| 1,522,931 | 1/1925 | Wirz | 138/31 |
| 1,835,977 | 12/1931 | Ernst et al. . | |
| 1,835,978 | 12/1931 | Ernst et al. . | |
| 1,888,990 | 11/1932 | Kurath . | |
| 1,999,834 | 4/1935 | Ernst . | |
| 2,030,966 | 2/1936 | Crane et al. . | |
| 2,830,609 | 4/1958 | Korsak et al. | 138/31 |
| 3,632,230 | 1/1972 | Ueda . | |
| 3,669,151 | 6/1972 | Fleming . | |
| 3,875,365 | 4/1975 | Beneteau . | |
| 3,889,467 | 6/1975 | Huffman et al. . | |
| 3,951,311 | 4/1976 | Johansson | 138/31 |
| 3,957,313 | 5/1976 | Doversberger . | |
| 3,987,708 | 10/1976 | Uhrich | 138/31 |
| 4,131,125 | 12/1978 | Tanguy . | |
| 4,138,846 | 2/1979 | Sakakibara . | |
| 4,388,052 | 6/1983 | Falendyz, Sr. et al. | 138/31 |
| 4,601,233 | 7/1986 | Sugano . | |
| 4,745,745 | 5/1988 | Faust . | |
| 4,867,294 | 9/1989 | de Tuesta . | |
| 5,624,105 | 4/1997 | Runkel | 138/31 |

OTHER PUBLICATIONS

Beachley, Norman H. and Andrew A. Frank, "Improving Vehicle Fuel Economy with Hybrid Power Systems," *Society of Automotive Engineers,* Paper 780667, pp. 1–10, Apr. 1977.

Frank, Andrew A. and Nroman H. Beachley, "Design Considerations for Flywheel–Transmission Automobiles," *Society of Automotive Engineers,* Paper 800886, pp. 1–13, Aug. 1980.

Frank, Andrew A. and Norman H. Beachler, "Evaluation of the Flywheel Drive Concept for Passenger Vehicles," *Society of Automotive Engineers,* Paper 790049, pp. 1–12, Mar. 1979.

Tollefson, S., Beachley, N.H., and F. J. Fronczak, "Studies of an Accumulator Energy–Storage Automobile Design with a Single Pump/Motor Unit," *Society of Automotive Engineers,* Paper 851677, pp. 1–9, Sep. 1985.

(List continued on next page.)

*Primary Examiner*—James F. Hook
*Attorney, Agent, or Firm*—DeWitt Ross & Stevens S.C.

[57] ABSTRACT

An energy storage device particularly suitable for use in hybrid fluid power systems and fluid systems utilizing accumulators. A piston accumulator has a primary face on one end of the piston and a series of secondary faces on the opposite end of the piston. Each face has an associated chamber, and one or more of the chambers of the secondary faces may be selectively connected to a system pressure line. Since the pressure of the system pressure line depends on (and varies with) the number of chambers connected thereto, the potential energy of the chamber of the primary face may be delivered to the system pressure line at a variety of output pressures. Similarly, the chamber of the primary face may be recharged with energy at a variety of input pressures.

38 Claims, 9 Drawing Sheets

OTHER PUBLICATIONS

Fronczak, Frank J. and Norman H. Beachley, "Fuel Economy and Operating Characteristics of a Hydropneumatic Energy Storage Automobile," *Society of Automotive Engineers,* Paper 851678, pp. 1–10, Sep. 1985.

Curtis, C.H., "Energy Storage Systems for Public Service Vehicles," *Institution of Mechanical Engineers International Conference on Integrated Engine Transmission Systems,* Bath, England (Jan. 1986), Conference Publications, pp. 117–126.

Beachley, Norman H. and Frank J. Fronczak, "Design of a Free–Piston Engine–Pump," *Society of Automotive Engineers,* pPaper 921740, pp. 1–8, Sep. 1992.

Pourmovahed, A., Baum, S.A., Fronczak, F.J. and N.H. Beachley, "Experimental Evaluation of Hydraulic Accumulator Efficiency With and Without Elastomeric Foam," *AIAA Journal of Propulsion & Power,* Apr. 1988, vol. 4, No. 2, pp. 185–192.

Jen, Y.M. and C.B. Lee, "Influence of an Accumulator on the Performance of a Hydrostatic Drive with Control of the Secondary Unit," *Proceedings of the Institute of Mechanical Engineers,* Oct. 1993, vol. 207, pp. 173–184.

ACCUMULATOR FOR ENERGY STORAGE AND DELIVERY AT MULTIPLE PRESSURES

STATEMENT REGARDING FEDERALLY SPONSORED RESEARCH

This invention was made with United States government support awarded by the following agencies: The U.S. Environmental Protection Agency, Grants X820766 and X822571. The United States has certain rights in this invention.

CROSS-REFERENCE TO RELATED APPLICATIONS

This application claims priority under 35 USC § 119(e) to U.S. provisional patent application Ser. No. 60/020,738 filed Jul. 1, 1996, the entirety of which is incorporated by reference herein.

FIELD OF THE INVENTION

The invention relates generally to energy storage devices, and more specifically to hydropneumatic energy storage devices suitable for use in hybrid power systems.

DESCRIPTION OF THE PRIOR ART

In recent years, great interest has been placed in the possibility of developing "hybrid power" systems for vehicles as an alternative to standard power systems which solely use combustion of fossil fuels. In these hybrid power systems, fossil fuel combustion is used when road conditions are such that combustion power offers optimum efficiency, and secondary forms of power are then used when combustion is less efficient or undesirable. As an example, hybrid electric vehicles are currently under development wherein the vehicles utilize combustion when power demands are high and then switch to a secondary electric power system when power demands have decreased; see, e.g., Beachley et al., "Electric and electric-hybrid cars—evaluation and comparison," Society of Automotive Engineers (SAE) Paper 730619; Beachley et al., "Improving vehicle fuel economy with hybrid power systems," SAE Paper 780667. These hybrid power systems may provide future vehicles with greatly decreased pollution and energy consumption.

As a way of further enhancing the energy efficiency of hybrid power vehicles, many of the hybrid power systems under development offer means for recapturing "wasted" vehicle energy and using it to charge the secondary power system. As an example, some proposed hybrid electric vehicles couple the vehicle's drive system to generators during deceleration and channel the resulting electricity to storage batteries. This results in substantial energy savings because the kinetic/potential energy of the vehicle, which would ordinarily be lost during braking, can be partially recaptured to later power the vehicle. Another example of a known hybrid power system utilizes a flywheel to capture potential energy during deceleration, and then rechannels it to the drive system at a later time (see, e.g., Frank et al., "Design considerations for flywheel-transmission automobiles," SAE Paper 800886; Frank et al., "Evaluation of the flywheel drive concept for passenger vehicles," SAE Paper 790049).

Yet another example of a hybrid power system which has been the subject of study is the "hybrid fluid" system, which proposes to have vehicles use accumulators to store energy for later use; see, e.g., Tollefson et al., "Studies of an accumulator energy-storage automobile design with a single pump/motor unit," SAE Paper 851677; Wu et al., "Fuel economy and operating characteristics of a hydropneumatic energy storage automobile," SAE Paper 851678; Curtis, "Energy storage systems for public service vehicles," Institution of Mechanical Engineers International Conference on Integrated Engine Transmission Systems, Bath, England (1986), Conference Publication at pp. 117–126. Accumulators are vessels/reservoirs which store potential energy in the form of a quantity of pressurized fluid. An example of a known accumulator is illustrated at the reference numeral 10 in FIG. 1. The accumulator 10 includes a vessel 12 having a primary chamber 14 filled with a compressible medium, a secondary chamber 16 which is usually filled with an incompressible medium, and a free piston 18 movably mounted within the vessel 12 to separate the chambers 14 and 16. (Owing to the use of the piston 18 within the accumulator 10, accumulators of this type are often referred to as piston accumulators; however, this disclosure will refer to both piston and non-piston accumulators generically as "accumulators.") The primary chamber 14 is pre-charged to pressure P via line 20. During the pre-charging procedure, the valve 24 is open and line 26 is unpressurized, or else line 26 is simply disconnected. The valve 22 is then closed to maintain primary chamber 14 in a charged state, and fluid from line 26 is delivered to secondary chamber 16 to further compress the fluid in primary chamber 14 and to store energy therein. The fluid in secondary chamber 16 is maintained at the same pressure P as the primary chamber 14. Valve 24 may then be actuated at the desired time to deliver fluid from system line 26, thereby allowing a device attached to line 26 to utilize the potential energy stored in the primary chamber 14. Thus, as an example, the pressure in primary chamber 14 can be increased during vehicle deceleration so the fluid from the secondary chamber 16 can later be used to power a vehicle by use of a hydraulic motor.

However, owing to several design obstacles, hybrid fluid power has not been viewed as being as promising as other hybrid power systems, most particularly hybrid electric power systems. Perhaps the greatest limitation of known accumulator systems is that they are simply not very versatile; in particular, they are only able to receive and deliver energy at a single pressure level. As an example, if the accumulator is charged to high pressure and the vehicle currently requires low pressure energy for greater efficiency, the designer is faced with the choice of either discarding the excess pressure by bleeding off fluid or incorporating conversion means for converting high pressure energy to low pressure energy. Since the primary object of the use of an accumulator is to conserve as much energy as possible, the designer must utilize the conversion means if the hybrid fluid system is to remain attractive. At present, there are two common choices for such conversion means.

First, rather than performing conversion per se, one can choose to utilize two or more accumulators 28, each charged to a different pressure and having an independent valve 30 connecting it to a common system pressure line 32 (FIG. 2). By actuating the appropriate valve 30, the system pressure line 32 is brought to the same pressure P1, P2, or P3 as a selected accumulator 28. While this allows the choice of a system pressure which is better suited to operating needs, this approach is not very practical for most power system applications owing to the large amount of space occupied by the multiple accumulator vessels 28, as well as the material and installation costs necessary to implement them.

Second, one can use a gas-containing pressure vessel 34 which is connected to the system pressure line 36 by several parallel cylinders 38, 40, and 42, all but one (40) having stepped pistons 44/46 (FIG. 3). The energy within the pressure vessel 34 may be supplied to the system pressure line 36 at the same or a different output pressure via use of the appropriate cylinder. This arrangement, which was proposed in Beachley et al., "Design of a free-piston engine-pump," SAE Paper 921740, is far superior to that of FIG. 2 in terms of space and cost. However, it is still somewhat bulky in comparison to power conversion apparatus for hybrid electric systems, since these tend to consist of electric components having lesser size. As a result, this arrangement is still not sufficiently compact to make it well suited for use in hybrid fluid systems.

Owing to the bulk, expense, and limited versatility of the prior art accumulator systems, there is a need for an accumulator system which allows for charging to and energy delivery from the accumulator at a wide variety of pressure levels, which occupies minimal space, and which requires minimal material and installation costs.

SUMMARY OF THE INVENTION

A preferred embodiment of the present invention includes an accumulator wherein a piston is movably mounted within a pressure vessel casing. One end of the piston has a primary face which closes a primary chamber within the casing, and the opposite end of the piston includes a number of secondary faces which each close a respective secondary chamber within the casing. Secondary chamber lines are connected to each of the secondary chambers, and each secondary chamber line is selectively connectable to a system pressure line by means of valves or equivalent fluid switching devices. The pressure of the system pressure line then depends on the number of secondary chambers to which it is connected and the size of these secondary chambers, i.e., the size of their secondary faces. As a result, the connection of different secondary chamber lines (or combinations of secondary chamber lines) to the system pressure line allows its pressure to be selectably varied. For example, where the secondary face having the smallest area has an area $A_{min}$, the connection of its secondary chamber line to the system pressure line yields a maximum pressure $P_{max}$ within the line. Where the other secondary faces have areas $2A_{min}$, $3A_{min}$, . . . $NA_{min}$, the common system line can adopt corresponding pressures 1/2 $P_{max}$, 1/3 $P_{max}$, . . . 1/N $P_{max}$ depending on which one single secondary chamber is placed in fluid communication with the system pressure line. A greater variety of pressures can be achieved in the system pressure line by placing two or more secondary chambers in fluid communication with the system pressure line; for example, where the secondary chambers corresponding to $A_{min}$ and $2A_{min}$ are connected to the system pressure line, the line will have pressure 1/3 $P_{max}$; where the secondary chambers corresponding to $A_{min}$, $2A_{min}$, and $3A_{min}$ are connected, the line will have pressure 1/6 $P_{max}$; and so on. Of course, the sizes of the secondary faces need not be integral multiples of the size of the smallest secondary face, as in the foregoing example. As will be discussed at greater length below, the secondary faces can instead be related in size in a variety of ways to yield different pressure relationships when different secondary chambers (or combinations of secondary chambers) are connected to the system pressure line.

By use of the arrangement above, the potential energy stored within the volume of the primary chamber can be delivered to the system pressure line at a variety of output pressures. Conversely, the primary chamber may be efficiently charged to a desired pressure by different pressure sources at different pressure levels by connecting the pressure sources to the appropriate secondary chambers via the secondary chamber lines. The accumulator can therefore be used to both deliver and store potential energy at a far wider range of pressures than the accumulators of the prior art, while occupying far less space and requiring far less material and installation costs than the prior art accumulators. The accumulator thus provides an exceedingly simple and elegant solution to the problems of the prior art accumulators and greatly enhances the feasibility of hybrid fluid power systems, as well as other hydraulic systems utilizing accumulators.

Further advantages, features, and objects of the invention will be apparent from the following Detailed Description of the Invention in conjunction with the associated drawings.

DETAILED DESCRIPTION OF THE INVENTION

Figure 1:
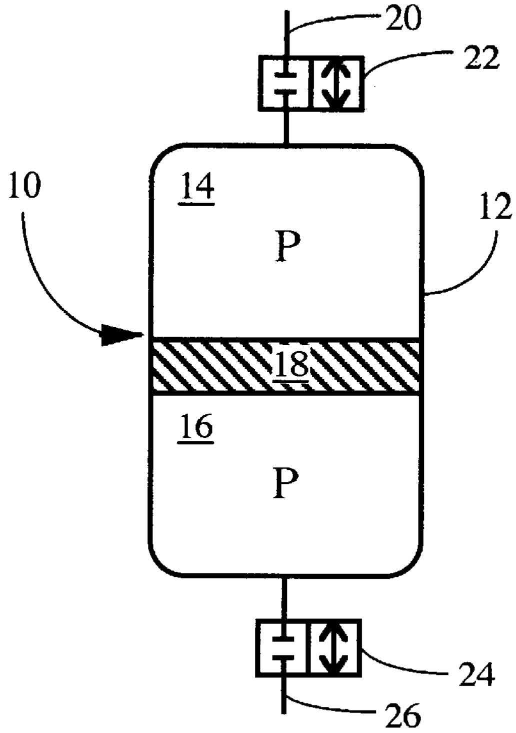
FIG. 1 PRIOR ART
FIG. 1 is a sectional schematic view of a known accumulator shown in elevation.
Figure 2:
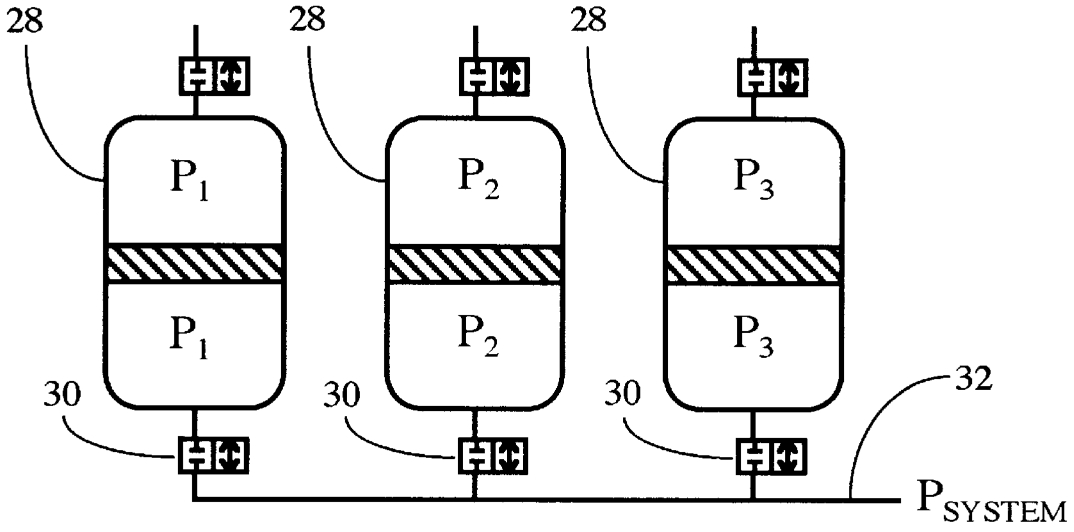
FIG. 2 PRIOR ART
FIG. 2 is a sectional schematic view of a known multiple-pressure, multiple-accumulator system, shown in elevation.
Figure 3:
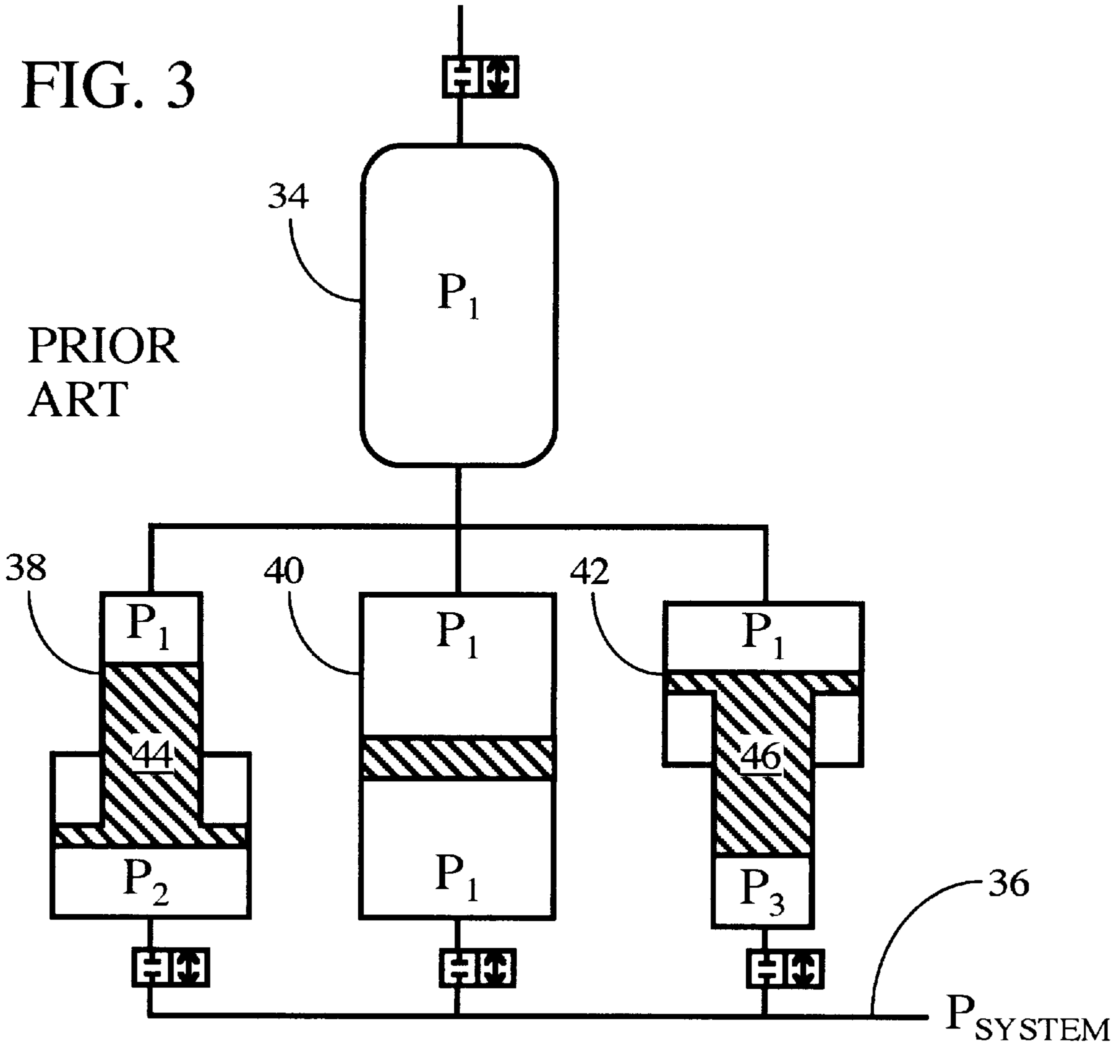
FIG. 3 PRIOR ART
FIG. 3 is a sectional schematic view of a known arrangement for delivering multiple pressures from an accumulator system, shown in elevation.
Figure 4:
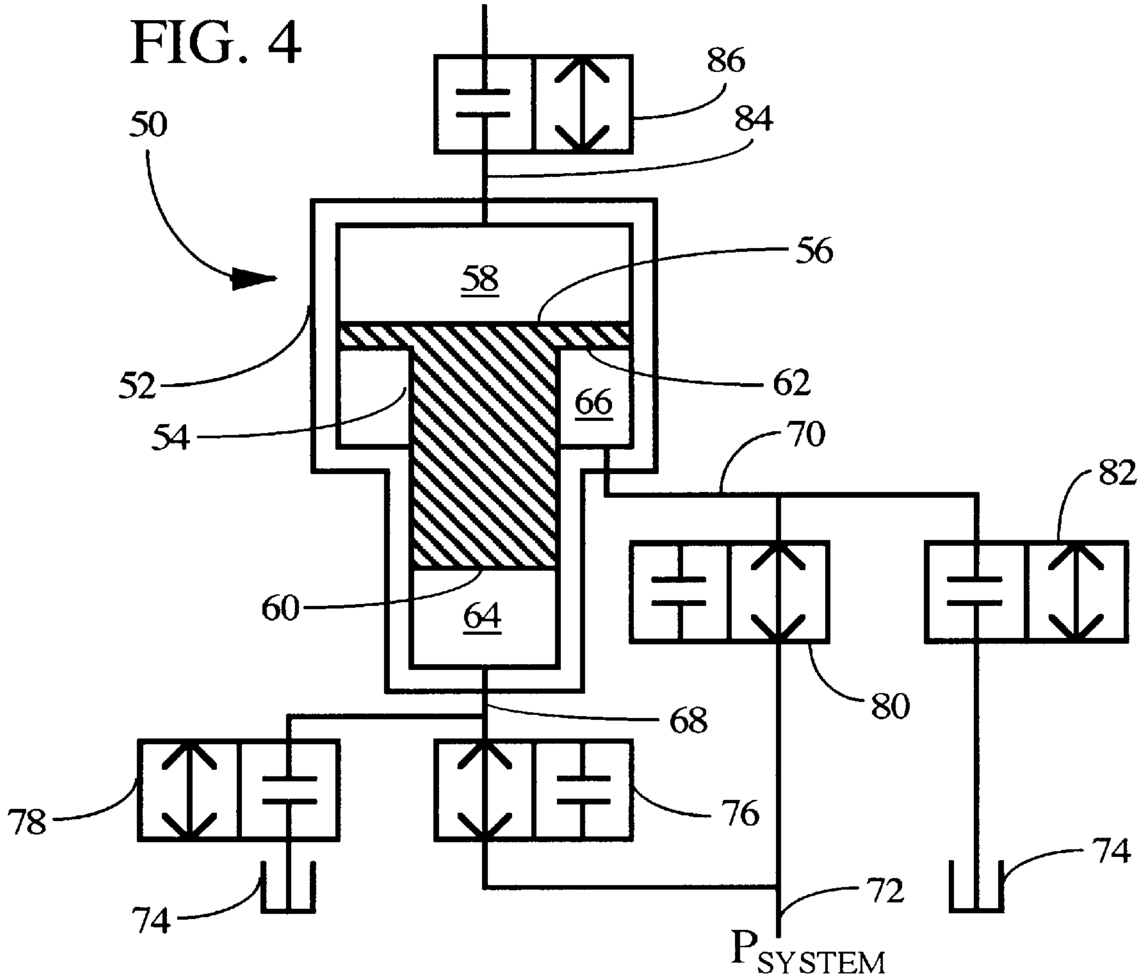
FIG. 4 is a sectional schematic view of a first preferred embodiment of the present invention, shown in elevation.

In the drawings, wherein the same or similar features of the invention are designated in all Figures with the same reference numerals, a preferred embodiment of an accumulator in accordance with the present invention is illustrated in FIG. 4 at the reference numeral 50. The accumulator 50 includes a pressure vessel casing 52 with a piston 54 movably mounted therein. The piston 54 divides the interior volume of the casing 52 into a number of chambers which are discussed in greater detail below, and the peripheral sides of the piston 54 contacting the casing 52 thus have seals (not shown) to prevent fluid from leaking between the chambers. One end of the piston 54 has a primary face 56 adjacent a primary chamber 58, and the opposite end includes a series of stepped secondary faces 60 and 62, each of which is situated adjacent a respective secondary chamber 64 or 66. The secondary chambers 64 and 66, which are preferably filled with hydraulic fluid or a similar substantially incompressible medium, have secondary chamber lines 68 and 70 which connect the secondary chambers 64 and 66 to either a common system pressure line 72 or a reservoir 74 depending on the settings of valves 76, 78, 80, and 82. The primary chamber 58 is preferably filled with nitrogen or another inert compressible medium, and may be precharged to a desired pressure via an accumulator line 84 and an associated accumulator valve 86. The pressure of the primary chamber 58 can further be altered by adding fluid to the secondary chambers 64 and 66.

Depending on whether selected valves 76, 78, 80 and 82 are open or closed, a variety of pressures can be obtained in the common system pressure line 72. When valves 76 and 82 are open and valves 78 and 80 are closed, i.e., when the secondary chamber 64 is in an open state with respect to the common system pressure line 72 and secondary chamber 66 is in an open state with respect to the reservoir 74, the relation between the pressures in the primary chamber 58 and the common system pressure line 72 can be precisely or closely represented by $$P_{primary}\,A_{primary}=P_{system}\,A_1$$

where $P_{primary}$ is the pressure in the primary chamber 58, $A_{primary}$ is the area of the primary face 56, $P_{system}$ is the pressure in the common system pressure line 72, and $A_1$ is the area of the secondary face 60.

This can also be expressed as $$P_{system} = \frac{A_{primary}}{A_1} P_{primary}$$

The pressure $P_{system}$ in the common system pressure line 72 has a similar relationship regarding the area $A_2$ of the secondary face 62 when the valves 78 and 80 are open and the valves 76 and 82 are closed (i.e., when the secondary chamber 66 is in an open state with respect to the common system pressure line 72 and the secondary chamber 64 is in an open state with respect to the reservoir 74):

$$P_{system} = \frac{A_{primary}}{A_2} P_{primary}$$

It thus follows that where $A_1$ and $A_2$ are different, the system pressure $P_{system}$ will be different when different secondary chambers 64 or 66 are in fluid communication with the common system pressure line 72. It is also possible to open both of the valves 76 and 80 (and close both of the valves 78 and 82) so that both secondary chambers 64 and 66 are in an open state with respect to the common system pressure line 72. This provides:

$$P_{system} = \frac{A_{primary}}{A_1 + A_2} P_{primary}$$

Where the combined areas $A_1+A_2$ of the secondary faces 60 and 62 are equal to the area $A_{primary}$ of the primary face 56 (as in FIG. 4), this arrangement yields $P_{system}=P_{primary}$.

Thus, it is seen that the potential energy of the primary chamber 58 may be delivered at a variety of different system pressures. The sizes of the secondary faces 60 and 62 can be chosen to provide the desired $P_{system}$ when one or both of the secondary chambers 64 and 66 are connected to the common system pressure line 72. To illustrate, a typical application might use the following area ratios for the secondary faces 60 and 62 and the primary face 56 (area $A_{primary}$):

$A_1$ (the area of secondary face 60)=0.6 $A_{primary}$ $A_2$ (the area of secondary face 62)=0.4 $A_{primary}$ This would, for the case where $P_{primary}$=2,000 psi, provide the three alternate pressure levels:

$P_{system}$=2,000 psi (both secondary chambers 64 and 66 in an open state with respect to the common system pressure line 72, i.e., valves 76 and 80 open, valves 78 and 82 shut)

$P_{system}$=3,333 psi (secondary chamber 64 in an open state with respect to the common system pressure line 72, i.e., valves 76 and 82 open, valves 78 and 80 shut)

$P_{system}$=5,000 psi (secondary chamber 66 in an open state with respect to the common system pressure line 72, i.e., valves 78 and 80 open, valves 76 and 82 shut)

After the piston 54 has traversed the secondary chambers 64 and 66 to its fullest extent, the primary chamber 58 of the accumulator 50 needs to be recharged. This can be accomplished by delivering fluid to one or both of secondary chambers 64 and 66 from line 72, with any chamber unconnected to line 72 being connected to the reservoir 74. The pressure to which the accumulator 50 is recharged depends on the pressure in the primary chamber 58 prior to recharging as well as which secondary chambers 64 and 66 are in fluid communication with line 72. The change in system pressure $P_{system}$ due to the movement of piston 54 is inversely related to the volume of primary chamber 58. To illustrate, in the example noted above, consider the case in which the fluid pressure in the primary chamber varies between 1000 psi when the piston 54 is at the bottom of its stroke (i.e., when the secondary chambers 64 and 66 are emptied of fluid) and 2000 psi when the piston 54 is at the top of its usable stroke (i.e., when the secondary chambers 64 and 66 have received as much fluid as they will accommodate). There are three ways in which the accumulator could be recharged to its maximum energy state. If both secondary chambers 64 and 66 are in fluid communication with the system pressure line 72, $P_{system}$ will be equal to the gas pressure in primary chamber 58 and therefore vary between 1000 and 2000 psi during the recharging process. If only secondary chamber 64 is open with respect to line 72 (secondary chamber 66 being open with respect to reservoir 74), $P_{system}$ will vary from 1667 to 3333 psi during the recharging process. If only secondary chamber 66 is open with respect to line 72 (and secondary chamber 64 is open with respect to reservoir 74), $P_{system}$ will vary from 2500 to 5000 psi during the recharging process. As the accumulator 50 is recharged, the pressure in primary chamber 58 increases as piston 54 moves upward, and therefore $P_{system}$ in line 72 will correspondingly increase. In a similar manner, as energy is being delivered from primary chamber 58, $P_{system}$ will decrease.

Figure 5:
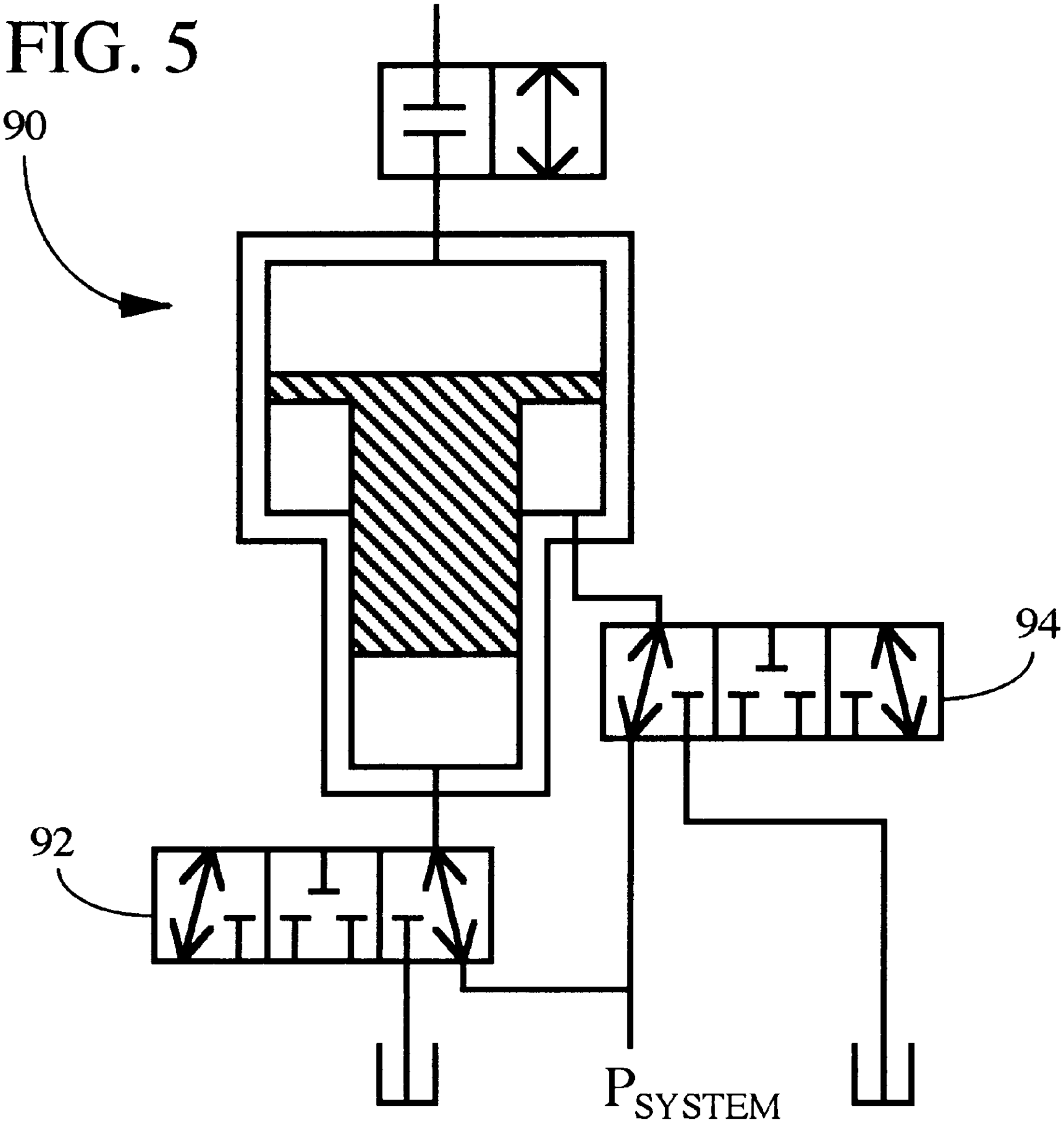
FIG. 5 is a sectional schematic view of a second preferred embodiment of the present invention, shown in elevation.

The accumulator 50 of FIG. 4 is illustrated with four two-way valves 76, 78, 80, and 82, e.g., solenoid-actuated two-way on-off poppet valves. A variety of other valves can be used in the invention as well. FIG. 5 illustrates an accumulator 90 which is generally equivalent to that illustrated in FIG. 4, but wherein the four valves 76, 78, 80, and 82 are replaced by two three-way three-position valves 92 and 94, e.g., solenoid-operated three-way spool or poppet valves. The illustrated center position of the three-way valves (i.e., the position wherein the secondary chambers are isolated from both the system pressure line and the reservoirs) is not necessary for the basic operation of the system; however, it provides a convenient means of isolating the accumulator from the system.

Figure 6:
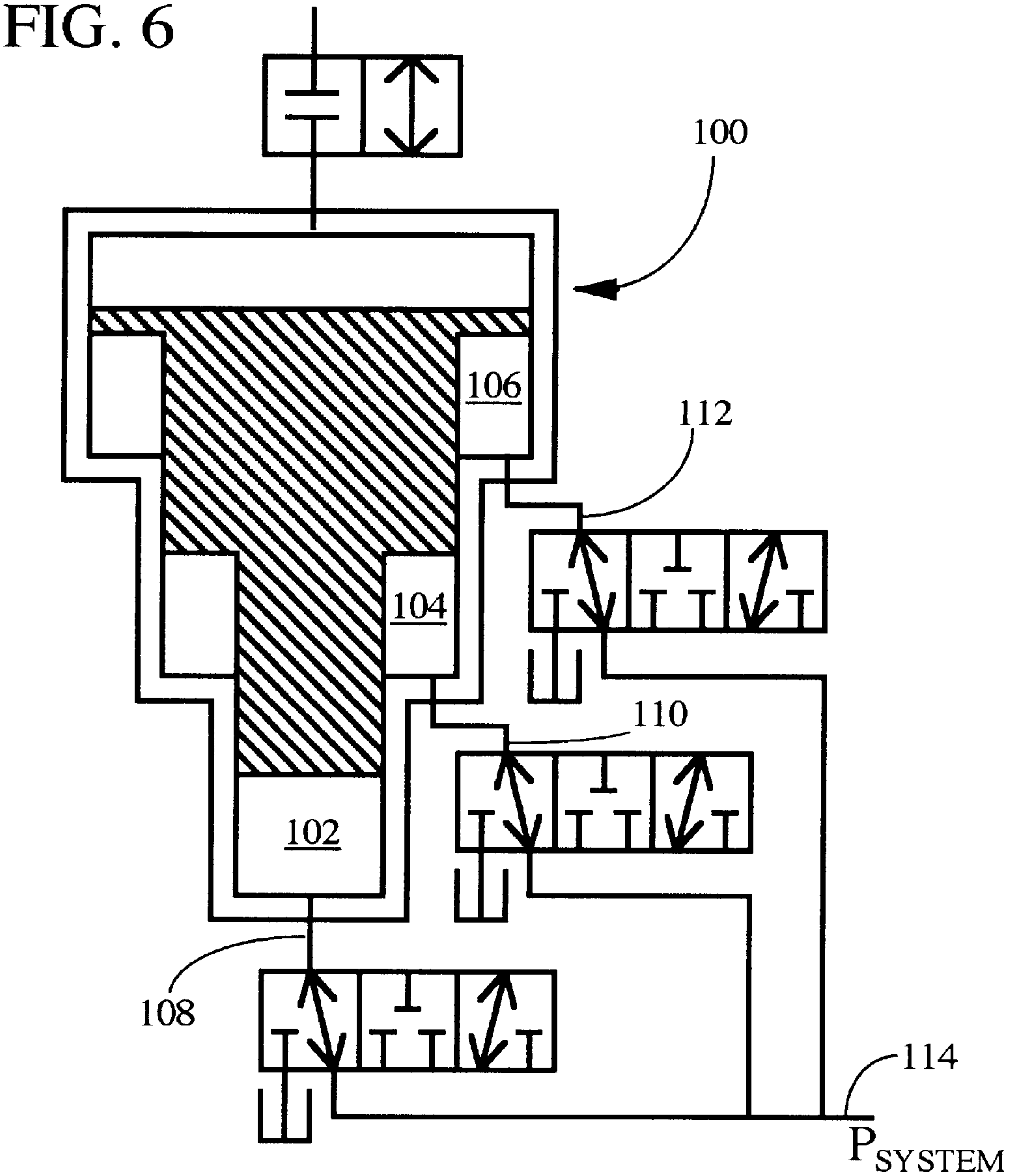
FIG. 6 is a sectional schematic view of a third preferred embodiment of the present invention, shown in elevation.

FIG. 6 illustrates another preferred accumulator 100 which is generally similar to the accumulators 50 and 90, but wherein three secondary chambers 102, 104, and 106 are included, each having its own line 108, 110, and 112 connected to the common system pressure line 114. In this accumulator 100, there are seven possible ways to combine one or more open secondary chambers:

1. only line 108 (secondary chamber 102) in an open state with respect to system pressure line 114;

2. only line 110 (secondary chamber 104) in an open state with respect to system pressure line 114;

3. only line 112 (secondary chamber 106) in an open state with respect to system pressure line 114;

4. only lines 108 and 110 (secondary chambers 102 and 104) in an open state with respect to system pressure line 114;

5. only lines 108 and 112 (secondary chambers 102 and 106) in an open state with respect to system pressure line 114;

6. only lines 110 and 112 (secondary chambers 104 and 106) in an open state with respect to system pressure line 114; and 7. all of lines 108, 110, and 112 (secondary chambers 102, 104, and 106) in an open state with respect to system pressure line 114.

Thus, the accumulator 50 provides seven possible pressure levels in the common system pressure line 114 depending on which secondary chamber or chambers are in an open state with respect to system pressure line 114. This is in contrast to the accumulators 50 and 90 of FIGS. 4 and 5, which provide three possible pressure levels when two secondary chambers are provided.

The concepts discussed above with respect to the accumulators of FIGS. 4–6 may be extended to accumulators with any number N of secondary chambers. To reexpress the analyses set out above for an accumulator having N secondary chambers, the system pressure $P_{system}$ can be expressed as $$P_{system} = \frac{A_{primary}}{\sum A_{connected}} P_{primary}$$

Where $\Sigma A_{connected}$ is the sum of the areas of the secondary faces whose secondary chambers are connected to the common system pressure line. For example, where only a single secondary face having an area $A_1$ has its secondary chamber connected to the common system pressure line, $P_{system}=P_{primary}\ A_{primary}/A_1$; where both of the secondary faces having areas $A_1$ and $A_2$ have their chambers connected, $P_{system}=P_{primary}\ A_{primary}/(A_1+A_2)$; and so on.

It is expected that it will generally be desirable to size all of the secondary faces differently. Where all of the secondary faces $A_1, A_2, \ldots A_N$ have the same areas and n chambers are connected to the common system pressure line, the system pressure $P_{system}$ may be expressed by $$P_{system} = \frac{A_{primary}\ P_{primary}}{A_{secondary}\ n}$$

where $A_{secondary}$ is the area of each of the secondary faces of the piston. Since this arrangement gives the same system pressure for any combination of n open secondary chambers, this arrangement has limited versatility. A greater potential range of pressures can be delivered and received where all of the secondary face areas $A_1, A_2, \ldots A_N$ are different. Since one can have $$\frac{N!}{(N-n)!n!}$$

different possible combinations of n chambers chosen from N possible chambers, differently-sized secondary faces provide the possibility of supplying $$\sum_{n=1}^{N} \frac{N!}{(N-n)!n!} = 2^N - 1$$

possible system pressures $P_{system}$. In other words, the use of two differently-sized secondary chambers will allow the choice of three different useful system pressures $P_{system}$; the use of three differently-sized secondary chambers will allow the choice of seven different useful system pressures $P_{system}$; the use of four differently-sized secondary chambers will allow the choice of fifteen different useful system pressures $P_{system}$; and so on. A recommended arrangement is to use secondary faces with areas that are integral multiples of the smallest secondary face, that is, to use secondary faces with areas substantially equal to Amin, 2 Amin, . . . N Amin, where Amin denotes the area of the smallest secondary face. However, in certain cases, it may be advantageous to size several secondary faces similarly if such an arrangement provides the desired pressure relationships.

It is also possible to close all valves leading from lines connected to the secondary chambers so that the secondary chambers are connected to neither the system pressure line nor a reservoir. This allows the system pressure $P_{system}$ to be completely independent of the accumulator pressure. If this case of an "isolated" system pressure line is taken into account along with the cases described above, an accumulator having N differently-sized secondary faces could be considered to provide the possibility of supplying $2^N$ different system pressures $P_{system}$. However, it is important to note that in the case of an isolated system pressure line, the accumulator is in a sense irrelevant: the system pressure $P_{system}$ is unrelated to the pressure in the primary chamber $P_{primary}$, and instead depends on the load which is otherwise placed on the system pressure line.

The accumulators described above have the normal losses associated with any piston accumulator, i.e., mechanical friction and thermodynamic losses from gas cycling. The mechanical friction is somewhat higher than for a normal piston accumulator because of the requirement for a sliding seal along the periphery of any piston face. The gas cycling losses should be comparable to those for a regular piston accumulator, and could be almost completely eliminated by the addition of open cell flexible foam in the gas chamber to act as insulation and a thermal damper; see, e.g., Pourmovahed et al, "Experimental Evaluation of Hydraulic Accumulator Efficiency With and Without Elastomeric Foam," AIAA Journal of Propulsion & Power, March/April, 1988. The energy storage capability of the accumulator (i.e., how much energy can be put into and taken out of the unit) is independent of whether the secondary chambers are in open or closed states, since the energy level at any time is determined by the volume and pressure of the gas in the primary chamber. The energy input and delivery capability is slightly affected by switching between states, because whenever one of the secondary chambers is disconnected from the common system pressure line and connected to its fluid reservoir, there are small energy losses associated with the compressibility of the fluid. These losses are typically expected to amount to no more than 2 or 3 percent, and their significance would depend upon how often the accumulator operating mode (i.e., the connectivity states of the various chambers) was changed. There would also be small leakage and throttling losses which would depend upon the design and quality of the valving used.

Figure 7:
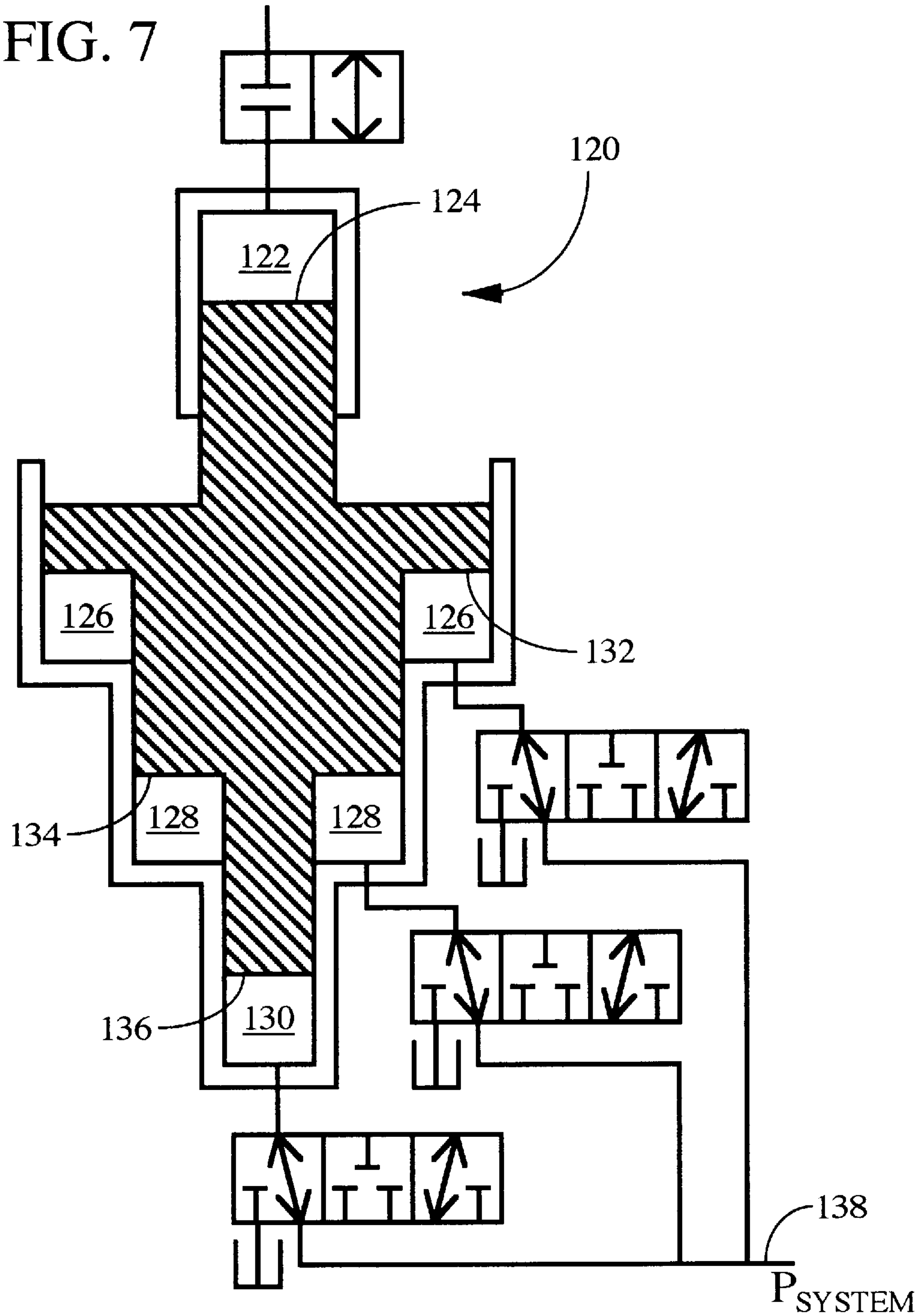
FIG. 7 is a sectional schematic view of a fourth preferred embodiment of the present invention, shown in elevation.

Various alternative embodiments of the accumulator are contemplated. First, the secondary faces can also be sized so that one or more combinations of secondary chambers connected to the system pressure line will result in a system pressure $P_{system}$ less than that of the primary chamber. To illustrate, consider the accumulator system 120 of FIG. 7, which includes a primary chamber 122 having a primary face 124 and secondary chambers 126, 128, and 130 having respective secondary faces 132, 134, and 136. The secondary faces 132 and 134 have greater area than primary face 124, whereas the secondary face 136 has lesser area. As a result, connection of either or both of secondary chambers 126 and 128 with the system pressure line 138 (and connection of the other secondary chambers to reservoirs) results in a system pressure $P_{system}$ less than the pressure in the primary chamber 122 $P_{primary}$. Connection of the secondary chamber 130 to the system pressure line 138 (and connection of the other secondary chambers to reservoirs) results in a system pressure $P_{system}$ greater than the pressure in the primary chamber 122 $P_{primary}$. Thus, it should be appreciated that if an accumulator includes secondary faces which range in size from areas greater than that of the primary face to areas less than that of the primary face, the accumulator can deliver and receive energy at pressures both less than and greater than the nominal accumulator pressure (i.e., the desired standard pressure in the primary chamber).

Figure 8:
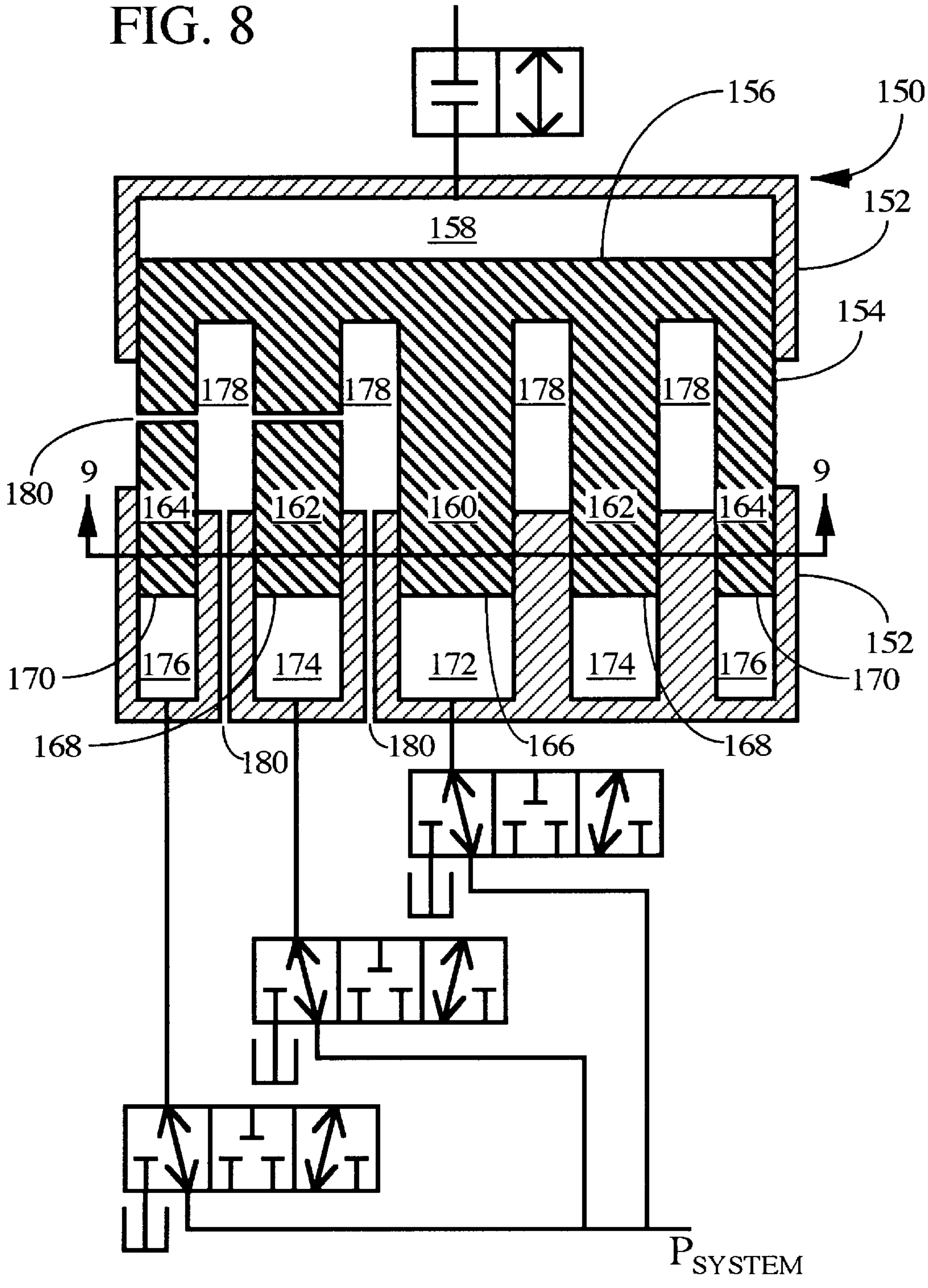
FIG. 8 is a sectional schematic view of a fifth preferred embodiment of the present invention, shown in elevation.
Figure 9:
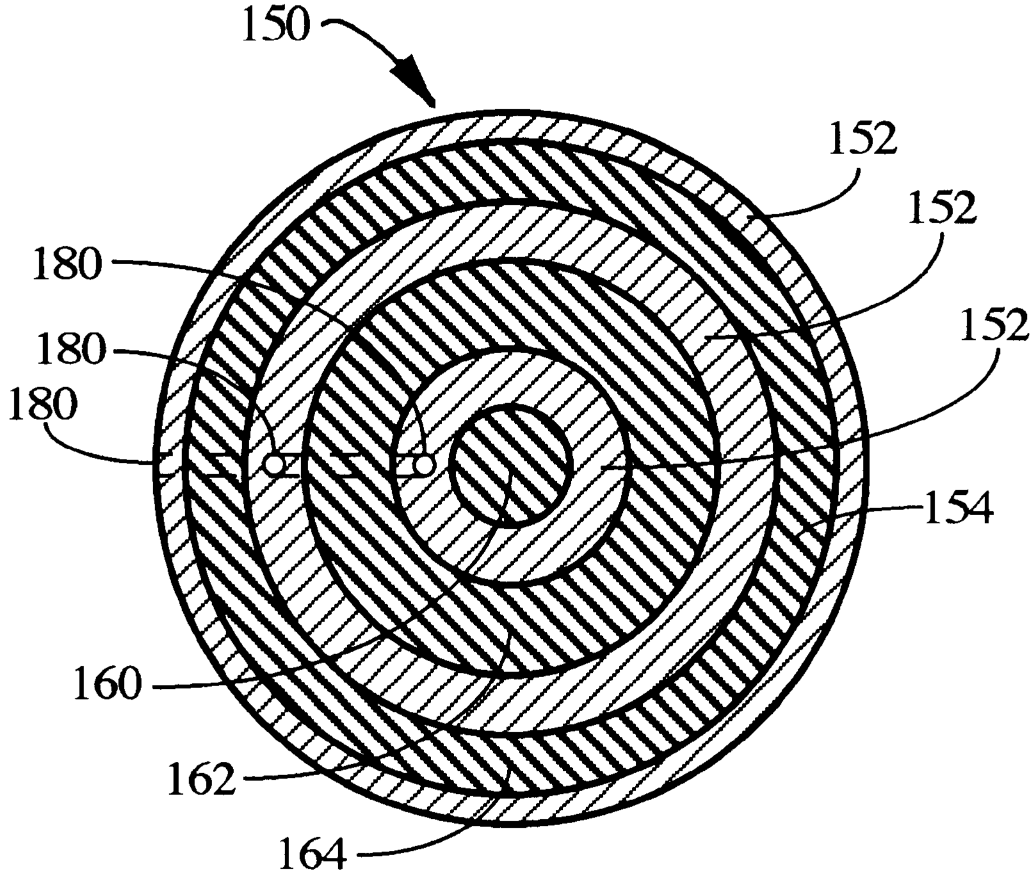
FIG. 9 is a sectional view of the embodiment of FIG. 8 along section 9—9.
Figure 11:
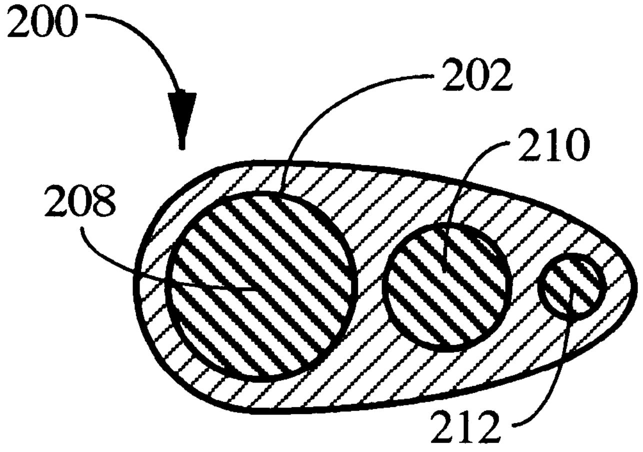
FIG. 11 is a sectional view of the embodiment of FIG. 10 along section 11—11.
Figure 10:
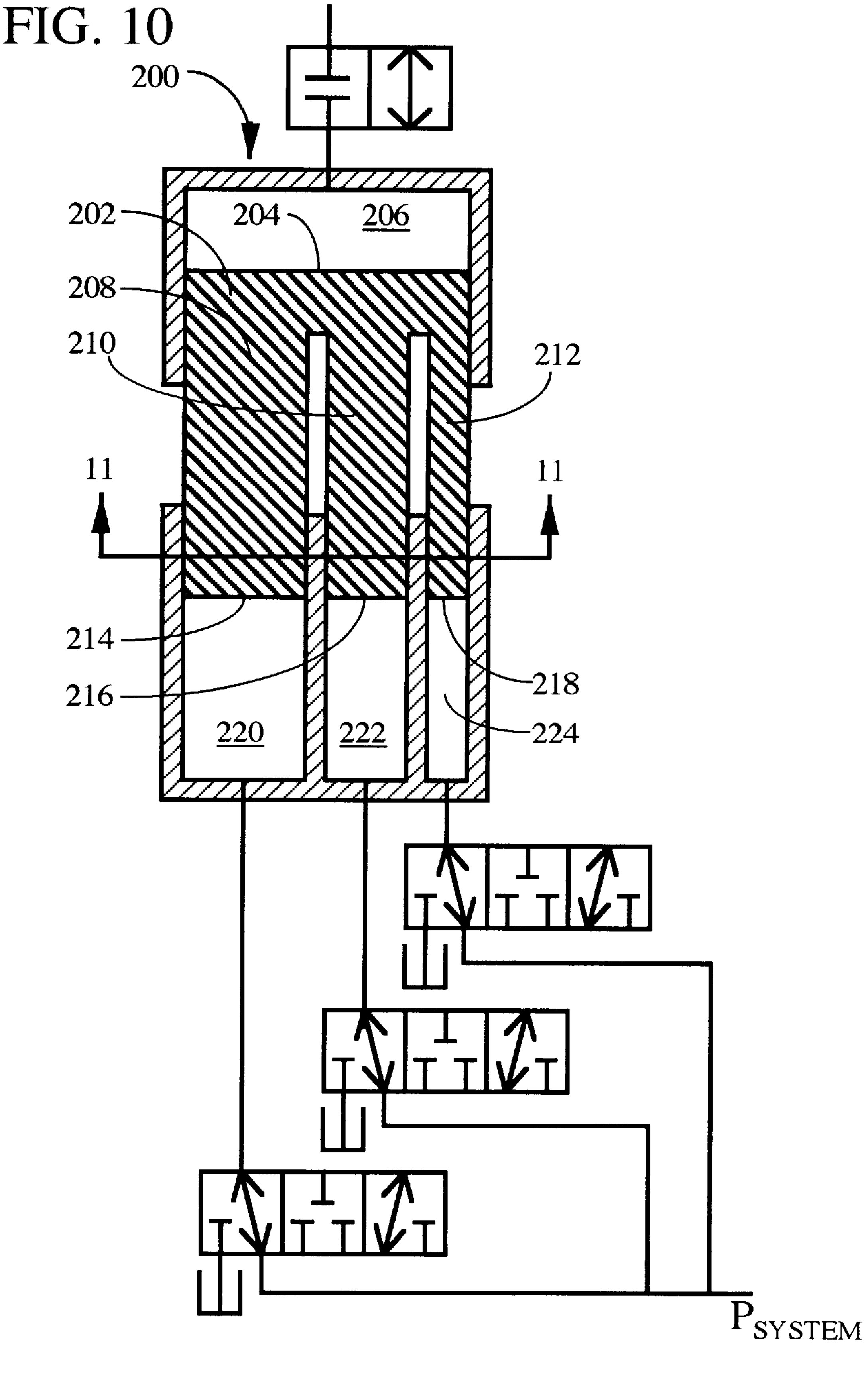
FIG. 10 is a sectional schematic view of a sixth preferred embodiment of the present invention, shown in elevation.

Second, a variety of piston configurations (e.g., non-cylindrical pistons, non-concentric stepped secondary faces, non-planar faces, etc.) may be used. Other arrangements are also possible. FIGS. 8 and 9 illustrate another accumulator system 150 wherein casings 152 surround a piston 154 which includes a primary face 156 at one end adjacent a primary chamber 158, and a series of concentric parallel secondary pistons 160, 162, and 164 with respective secondary faces 166, 168, and 170 at the opposing end adjacent respective secondary chambers 172, 174, and 176. This accumulator system 150 operates in generally the same fashion as the accumulator system 100 described above, but offers the potential for further space savings by reducing piston length. If desired, pressure in the concentric voids 178 between the secondary pistons 160, 162, and 164 can be set equal to the environmental pressure by including one or more passages 180 leading to the atmosphere through casings 152 and piston 154, or through the casings 152 alone. Alternatively, the pressure in the concentric voids 178 could be set equal to the pressure in the primary chamber 158 or one or more of the secondary chambers 172, 174, and 176 by adding appropriate passages through the piston 154. FIGS. 10 and 11 then illustrate a further accumulator system 200 wherein a piston 202 has a primary face 204 at one end adjacent a primary chamber 206, and a series of non-concentric parallel secondary pistons 208, 210, and 212 having a variety of differently-sized secondary faces 214, 216, and 218 at the opposing end adjacent respective secondary chambers 220, 222, and 224. It can be appreciated that the non-stepped piston arrangements of the accumulator systems 150 and 200 can be combined with the non-stepped piston arrangements of the accumulator systems 50, 90, 100, and 120 if desired, e.g., the secondary pistons may be stepped, or stepped piston faces may include secondary pistons extending therefrom. Different combinations of stepped and non-stepped piston arrangements can be used to fit accumulator systems having the desired pressure characteristics into different volumes having particular sizes and shapes. It is also notable that in contrast to the solid pistons illustrated in the Figures, hollow pistons would likely be advantageous in most applications to decrease the overall weight and size of the apparatus. Any sealing arrangements known to the art may be used with any of the pistons described within this disclosure.

Third, more than one common system pressure line may be provided, and different secondary chambers (or sets of secondary chambers) may be connected to the different common system pressure lines. This can allow some of the secondary chambers to serve in a hybrid power system (e.g., in a vehicle's drive system) and other secondary chambers may deliver fluid power to other apparata (e.g., to a hydraulic cylinder attached to the vehicle for lifting an earth-moving scoop). Similarly, some of the secondary chambers can be connected to drive systems (e.g., hydraulic motors) and used solely for delivering energy, and other secondary chambers can be connected to charging systems (e.g., hydraulic pumps) and be used solely for inputting energy.

Fourth, it is understood that primary chambers of the aforementioned accumulators may be charged with energy through any or all of direct fluid input from a charging line in fluid communication with the primary chamber (e.g., the accumulator line 84 and accumulator valve 86 shown in FIG. 4), energy input from the common system pressure line and one or more secondary chambers, or any other charging means or method known to the art. To review, the accumulator 50 of FIG. 4 offers two modes of charging, through either or both of the accumulator line 84 and the common system pressure line 72.

Fifth, compressible media in the primary chamber may be replaced by compressible non-fluid apparata such as springs or other structures which are capable of storing potential energy. This may be useful in situations where it is impractical or potentially hazardous to have a gas-charged pressure vessel present.

It is apparent that the accumulator design described above offers a simple and exceedingly elegant means for allowing energy storage and delivery at a variety of output and input pressures. For example, it can be used in a hybrid power system to deliver energy to a hydraulic motor for drive purposes, and it can be recharged during braking/deceleration to store and re-use energy that would otherwise be lost. The accumulator design may also be useful in any other hydraulic systems using accumulators, e.g., presses, machine tools, and earthmoving equipment. It is also notable that when the accumulator is used for energy-absorbing purposes (e.g., braking or shock absorption), as in automotive shock absorbers and suspension systems, the ability to selectably connect one or more of the secondary chambers provides for a very effective variable resistance brake or spring. In contrast to the systems of the prior art, the accumulator occupies much less space and has greatly decreased material and installation costs.

It is understood that preferred embodiments of the invention have been described above in order to illustrate how to make and use the invention. The invention is not intended to be limited to these embodiments, and is intended to encompass all alternate embodiments that fall literally or equivalently within the scope of the claims set out below.

What is claimed is:

1. An accumulator comprising a piston movably mounted in a casing, the piston having a primary face and an opposing series of secondary faces, each face having its own chamber within the casing, wherein N chambers of the secondary faces include respective secondary chamber lines selectively connectable to a common system pressure line, N being greater than or equal to 2 and less than or equal to the number of secondary faces, whereby the common system pressure line may be selectively set to a maximum of $2^N$ possible pressures.

2. The accumulator of claim 1 wherein the secondary faces are stepped on the piston.

3. The accumulator of claim 1 wherein the piston defines a series of parallel secondary pistons, each including one secondary face.

4. The accumulator of claim 1 wherein the chamber of the primary face contains a substantially compressible medium.

5. The accumulator of claim 4 wherein the common system pressure line contains a substantially incompressible medium.

6. The accumulator of claim 1 wherein each secondary chamber line may be selectively placed in fluid communication with a reservoir.

7. The accumulator of claim 6 wherein the N chambers of the secondary faces each have only two mutually exclusive states:

a first state wherein the chamber is solely in fluid communication with the reservoir, and a second state wherein the chamber is solely in fluid communication with the common system pressure line.

8. The accumulator of claim 6 wherein the N chambers of the secondary faces each have only three mutually exclusive states:

a first state wherein the chamber is closed, a second state wherein the chamber is solely in fluid communication with the reservoir, and a third state wherein the chamber is solely in fluid communication with the common system pressure line.

9. The accumulator of claim 1 wherein each secondary face has a different area.

10. The accumulator of claim 9 wherein the secondary faces have areas substantially equal to Amin, 2 Amin, . . . N Amin, respectively, where Amin denotes the smallest area.

11. The accumulator of claim 1 wherein the chamber of the primary face is closed.

12. The accumulator of claim 1 wherein each of the N chambers of the secondary faces may be selectively placed in fluid connection with a reservoir, and wherein each includes the following two mutually exclusive states:

a first state wherein the chamber is solely in fluid communication with the reservoir, and a second state wherein the chamber is solely in fluid communication with the common system pressure line.

13. An accumulator comprising a piston movably mounted in a casing, the piston having a primary face and an opposing series of secondary faces, each face having its own chamber within the casing, wherein each chamber of the secondary faces includes a secondary chamber line which can be selectively placed in fluid communication with a common system pressure line, whereby the common system pressure line has a pressure inversely proportional to the summation of the areas of the secondary faces whose secondary chambers are connected to the common system pressure line.

14. The accumulator of claim 13 wherein each secondary face has a different area, the smallest secondary face has an area of Amin, and the remaining secondary faces each have areas substantially equal to an integral multiple of Amin.

15. The accumulator of claim 13 wherein each secondary chamber line may be selectively placed in fluid communication with a reservoir.

16. The accumulator of claim 15 wherein each secondary chamber line has only two mutually exclusive states:

a first state wherein the secondary chamber line is solely in fluid communication with the reservoir, and a second state wherein the secondary chamber line is solely in fluid communication with the common system pressure line.

17. The accumulator of claim 13 wherein the chamber of the primary face is closed.

18. The accumulator of claim 13 wherein the chamber of the primary face contains a substantially compressible medium and the chambers of the secondary face contain a substantially incompressible medium.

19. The accumulator of claim 13 wherein the secondary faces are stepped on the piston.

20. The accumulator of claim 13 wherein the piston defines a series of parallel secondary pistons, each including one secondary face.

21. An accumulator comprising a piston movably mounted in a casing, the piston having a primary face adjacent a primary chamber and an opposing series of at least two secondary faces, each secondary face adjacent its own secondary chamber within the casing, wherein each secondary chamber is connected to a respective valve selectively connecting the secondary chamber to a reservoir or connecting the secondary chamber to a common system pressure line, whereby the common system pressure line thereby has pressure inversely proportional to the sum of the areas of the secondary faces of the secondary chambers connected thereto.

22. The accumulator of claim 21 wherein the chamber of the primary face contains a substantially compressible medium and the common system pressure line contains a substantially incompressible medium.

23. The accumulator of claim 21 wherein each secondary chamber line may be selectively placed in fluid communication with a reservoir.

24. The accumulator of claim 23 wherein the chambers of the secondary faces each have only two mutually exclusive states:

a first state wherein the chamber is solely in fluid communication with the reservoir, and a second state wherein the chamber is solely in fluid communication with the common-system pressure line.

25. The accumulator of claim 21 wherein the chamber of the primary face is closed.

26. The accumulator of claim 21 wherein each secondary face has a different area, and wherein the secondary faces have areas substantially equal to Amin, 2 Amin, . . . N Amin, respectively, where Amin denotes the smallest area and N denotes the number of secondary faces.

27. The accumulator of claim 21 wherein the secondary faces are stepped on the piston.

28. The accumulator of claim 21 wherein the piston defines a series of parallel secondary pistons, each including one secondary face.

29. An accumulator comprising a piston movably mounted in a casing, the piston having a primary face adjacent a primary chamber and an opposing series of at least two secondary faces, each secondary face being adjacent its own secondary chamber within the casing, wherein N secondary chambers of the secondary faces include respective secondary chamber lines selectively and independently connectable to a common system pressure line, N being greater than or equal to 2 and less than or equal to the number of secondary chambers, and further wherein none of the N secondary chambers are connected to the primary chamber, whereby the common system pressure line may be selectively set to a maximum of $2^N$ possible pressures which are inversely proportional to the summation of the areas of the secondary faces whose secondary chambers are connected to the common system pressure line.

30. The accumulator of claim 29 wherein the chamber of the primary face is closed.

31. The accumulator of claim 29 wherein the piston defines a series of parallel secondary pistons, each including one secondary face.

32. The accumulator of claim 31 wherein the secondary faces are stepped on the piston.

33. The accumulator of claim 29 wherein the primary chamber contains a substantially compressible medium and the common system pressure line contains a substantially incompressible medium.

34. The accumulator of claim 29 wherein the secondary chamber lines may each be selectively placed in fluid communication with a reservoir.

35. The accumulator of claim 34 wherein each of the N secondary chambers have only two mutually exclusive states:

a first state wherein the secondary chamber is solely in fluid communication with the reservoir, and a second state wherein the secondary chamber is solely in fluid communication with the common system pressure line.

36. The accumulator of claim 34 wherein each of the N secondary chambers have only three mutually exclusive states:

a first state wherein the secondary chamber is closed, a second state wherein the secondary chamber is solely in fluid communication with the reservoir, and a third state wherein the secondary chamber is solely in fluid communication with the common system pressure line.

37. The accumulator of claim 29 wherein each secondary face has a different area.

38. The accumulator of claim 29 wherein the secondary faces have areas substantially equal to Amin, 2 Amin, . . . N Amin, respectively, where Amin denotes the smallest area.

* * * * *